United States Patent [19]

Yang

[11] Patent Number: 4,873,920

[45] Date of Patent: Oct. 17, 1989

[54] VACUUM FRYING AND OIL SEPARATING DEVICE

[76] Inventor: Chen-Shi Yang, No. 2, Lane 1558, Ming-Chueng E. Road, Taipei, Taiwan

[21] Appl. No.: 205,348

[22] Filed: Jun. 10, 1988

[51] Int. Cl.⁴ ............................................. A47J 37/12
[52] U.S. Cl. ...................................... 99/409; 99/330; 99/403; 99/416; 99/472
[58] Field of Search ................. 99/330, 419, 403–405, 99/407, 408, 409, 410, 416, 417, 472, 421 R, 477–479; 426/519, 520, 523, 438; 366/234

[56] References Cited

U.S. PATENT DOCUMENTS

| | | | |
|---|---|---|---|
| 940,557 | 11/1909 | Roe | 99/409 |
| 2,027,146 | 1/1936 | Bly et al. | 99/409 X |
| 2,735,357 | 2/1956 | Gagnon | 99/409 X |
| 3,718,485 | 2/1973 | Lankford | 99/472 X |
| 3,973,481 | 8/1976 | Mies | 99/408 |
| 4,059,046 | 11/1977 | Yamazaki et al. | 99/405 X |

Primary Examiner—Timothy F. Simone
Attorney, Agent, or Firm—Bacon & Thomas

[57] ABSTRACT

A frying and oil separating device for frying raw materials and separating the absorbed oil from the fries under low pressure or vacuum through the provision of an insulated space maintained at a low pressure for sequentially frying the raw materials and separating the absorbed oil from the fries therein prior to removing the fries out of the space.

4 Claims, 2 Drawing Sheets

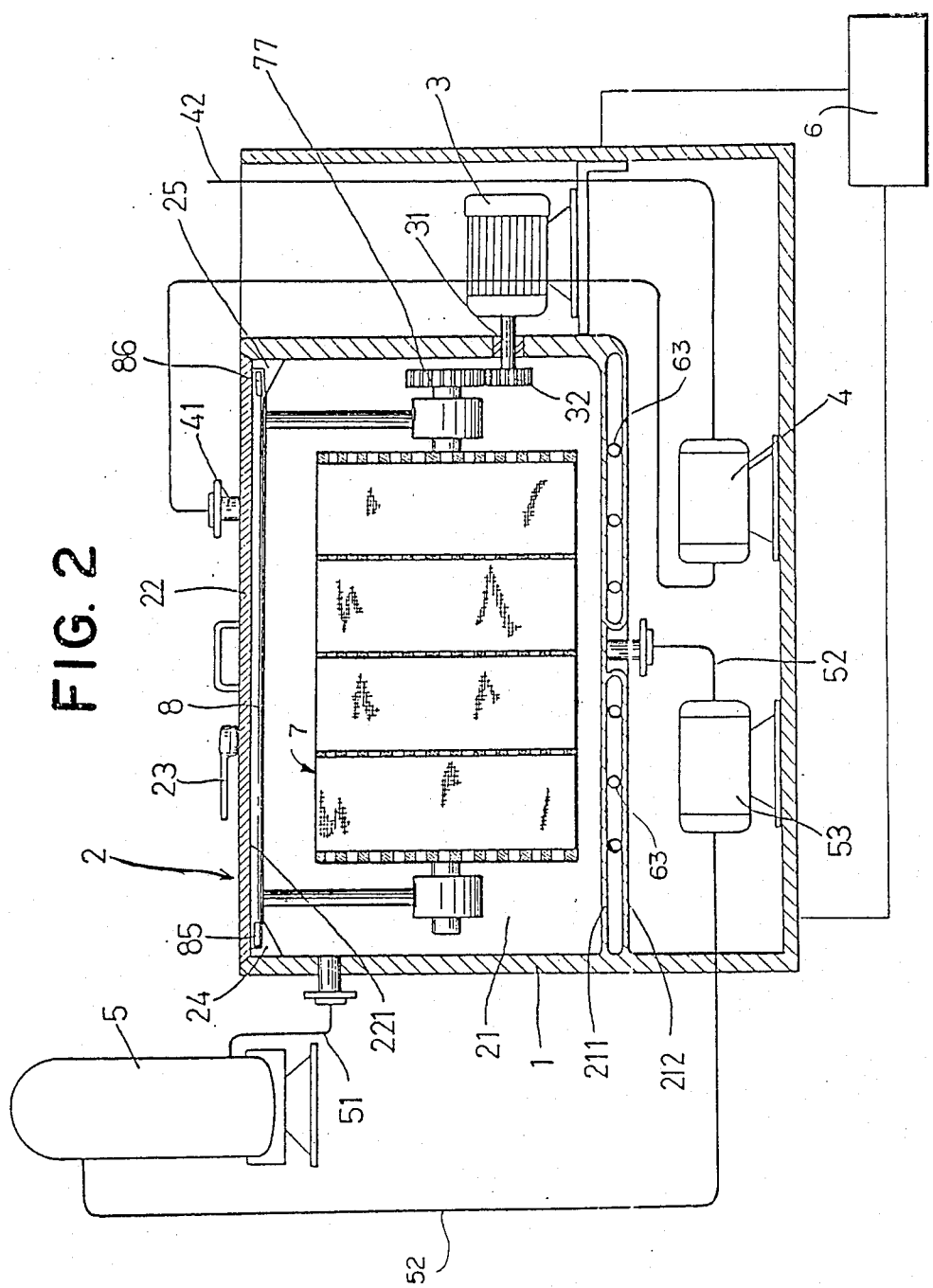

4,873,920

VACUUM FRYING AND OIL SEPARATING DEVICE

FIELD OF THE INVENTION

A vacuum frying and oil separating device for sequentially frying raw materials and separating the absorbed oil from the fries under vacuum or low pressure.

BACKGROUND OF THE INVENTION

This invention relates to a device for frying raw materials under low pressure or vacuum, and more particularly to a frying and oil separating device for frying raw material and separating most of the absorbed oil in the same circumstance.

Conventionally, a variety of the frying machine are used in frying sausages, chicken, crisps or potato chips, etc. in the open air. It is found disadvantageous that the fries thus obtained are greasy and the frying oil is oxidized after a relatively short period of usage.

A technic of vacuum frying method provided for frying raw materials such as chips of potato, apple, banana and the like was developed several years ago, where a frying space maintained at low pressure, which facilitates the vaporization of water contained in the raw materials as heated, is provided for frying said materials at lower pressure and temperature, under which the frying oil is insulated from the open air so as to prevent it from oxidation, and thus obtain fries almost remaining original tastes and colors. Furthermore, the working life of the frying oil is effectively prolonged.

It is found that the fries absorb rich oil, which is difficult to be effectively separated from the fries once the fries are shifted to an open air after frying, and become greasy.

SUMMARY OF THE INVENTION

Accordingly, it is an object of the present invention to provide a frying and oil separating device which will overcome the disadvantages noted heretofore.

It is another object of the present invention to provide a frying and oil separating device which produces fries containing little residual oil.

It is yet another object of the present invention to provide a frying and oil separating device having portable containers for loading raw material to be fried.

The foregoing objectives are achieved according to this invention through the provision of a frying and oil separating space properly insulated from outdoors and maintained at a low pressure for sequentially frying raw materials and separating the absorbed oil under same circumstance.

BRIEF DESCRIPTION OF THE DRAWINGS FIG. 1 is an exploded and perspective view of a frying and oil separating device according to the present invention; and FIG. 2 is a cross-sectional view of the frying and oil separating device in assembled condition.

DETAILED DESCRIPTION OF THE PREFERRED EMBODIMENT

Figure 1:
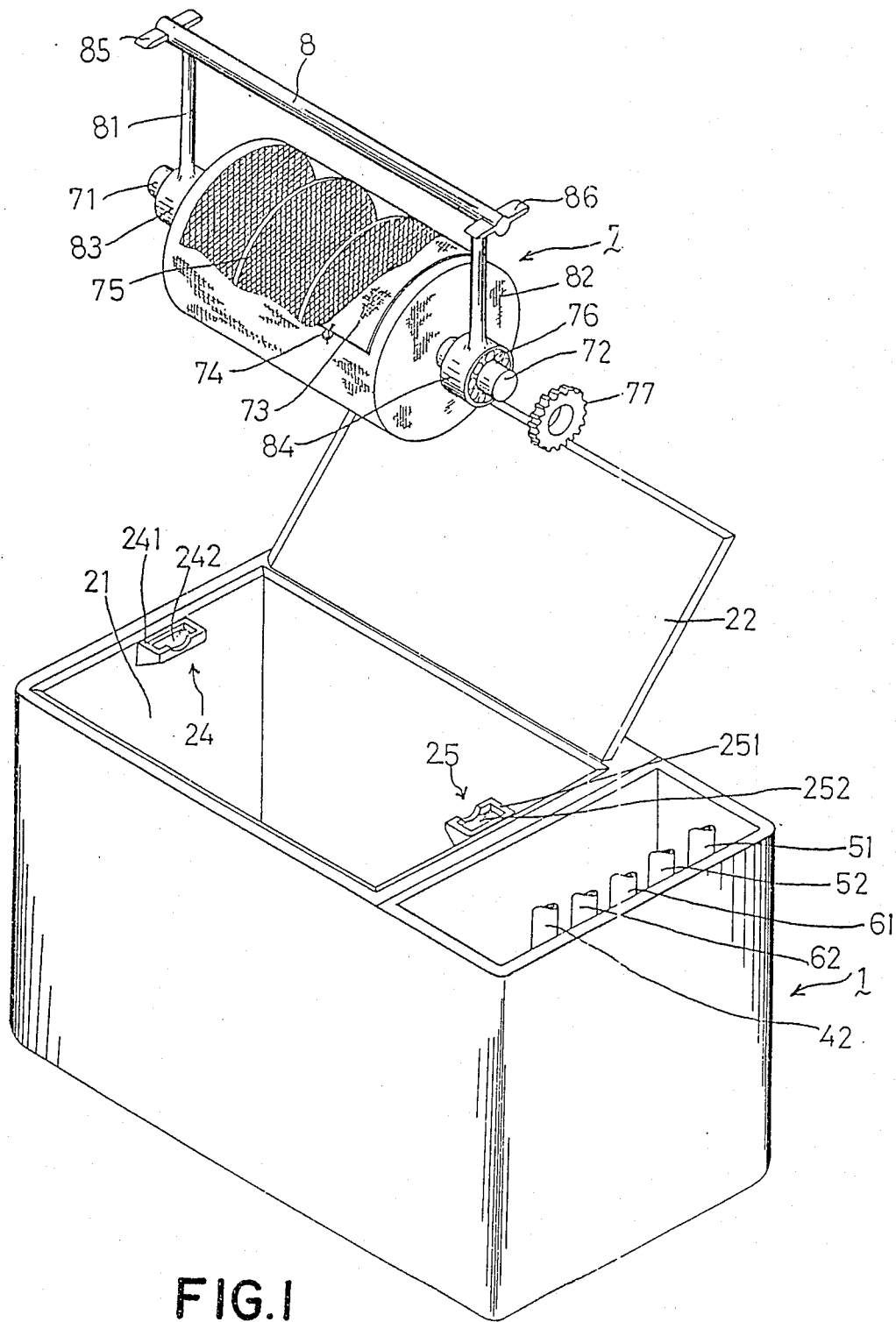

The following is a detailed description of the best presently contemplated embodiment of the invention. This description is not to be taken in a limiting sense, but is made merely for the purpose of illustrating the general principles of the invention.

As shown in FIGS. 1 and 2, a frying and oil separating device of the present invention comprises a vessel-shaped outer case 1, a vacuum frying apparatus 2 and essential auxiliary apparatus such as air-suction apparatus 4, frying oil supply apparatus 5 and water cooler 6.

Said vacuum frying apparatus 2 includes a frying compartment 21 located in the upper portion of the inner space of the outer case 1 with an opening 214 formed in the top wall 213 thereof. A hinged lid 22 corresponding to said opening 214 is provided for airtightly closing the opening 214. A lock means 23 with elements correspondingly disposed on the top surfaces of said top wall 213 and lid 22 is provided for securing the lid 22 in its closing position. A pair of support projectors 24, 25 having respective reccesses 242, 252 formed in the plane surfaces thereof are disposed on the opposite inner side walls in positions close to the opening 214.

A motor 3, being variable of rotating speeds and directions (clockwise or counterclockwise), is properly located with a shaft 31 substantially horizontally protruded into the frying compartment 21 through one of said opposite side walls with a gear 32 centrally secured at the end thereof.

Said air-suction apparatus 4 includes a suction pump 4 installed on the bottom plate of said outer case 1 and having an inlet pipe 41 communicatingly connected at said top wall 213 and an outlet pipe 42 communicating with open air.

Said frying oil supply apparatus 5 includes an oil tank 5 having heater and filters not shown), a discharge pipe 51 interconnecting the oil tank 5 and the frying compartment 21 at its upper portion and a suction pipe 52 interconnecting the oil tank 5 and the frying compartment 21 at its lower or bottom wall 211 for e.g. feeding, withdrawing or renewing the frying oil of the frying compartment 21.

Said water cooler 6 includes a cooling coil 63, which is attached to the bottom wall 211 of the frying compartment 21, a water pump 64 and a water tank 6 interconnected with pipes 61, 62 to form a circulation system for cooling the frying oil down to a lower preselected temperature.

At least a portable container 7 comprises a cylindrical outer case 9 made of heat resistant material such as wire net, which facilitates oil communication such as the introduction of the heated oil for frying the submerged raw material loaded therein or oil escapement therefrom, having a port hole (not shown), over which a corresponding hinged lid 73 is provided for closing said port hole and is kept in its closing position by means of a lock means 74 during e.g. the drying and oil separating periods, formed in the periphery thereof for loading the raw material to be fried or unloading the fries. A plurality of circular partition members 75 also made of wire net are fittingly and spacingly fixed in the chamber of the cylindrical outer case to divide it into a plurality of smaller compartments for relatively evenly distributing the raw material It is to be noted that the smaller compartments in the chamber can be arranged in a variety of other geometric formats. Two lateral shafts 71, 72, on which two ball bearings 76 and at least a gear 77 intermeshable with the gear 32 of the motor 3 are firmly sleeved, extend axially from the side walls of the cylindrical outer case. A handle 8 having two connecting rods 81, 82 extending downward and two ring members 83, 84, which are respectively sleeved and secured on the ball bearings 76, are also attached to the lower ends of the connecting rods 83, 84. Two support plates 85, 86 adapted to be received in said recesses 242, 252 are transversely provided at the ends of the handle 8.

In assembling, as particularly shown in FIG. 2, the portable container 7 is manually positioned in the frying compartment 21 where the support plates 85, 86 are received in the recesses 242, 252 and the gear 77 is engaged with the gear 32 of the motor 3. Said support plates 85, 86 are firmly sandwiched by the support projectors 24, 25 and the lid 22 as it is closed.

In operation, the frying compartment 21 is filled with sufficient heated oil so that the connected portable container 7 is totally or partially submerged in the frying oil. During the frying period, the shafts 71, 72 in association with the cylindrical outer case loaded with raw material can be alternately driven to rotate clockwise and counterclockwise at relatively low speed e.g. 60 to 100 r/p/m/ by means of the motor 3 through the engaged gears 32, 77 with intervals for damping the prior rotation to stop with the submerging oil before the start of reverse rotation, so that the disturbed raw material can be evenly fried, and massive combining of the fries can be effectively prevented.

The frying period, temperature and pressure are selected according to the raw material to be fried, and the temperature adjustments can be shortly achieved by means of the heater installed in the oil tank 5 or the water cooler 6.

As described heretofore, the fries thus obtained absorb rich oil, meaning that oil-separation treatment is necessary. The cylindrical outer case 9 is further driven to rotate at a relatively high speed e.g. 300 to 500 r.p.m. to separate the absorbed oil from said fries under the same low pressure by centrifugal force after the withdrawing of the oil in the frying compartment 21 withdrawn by the oil supply apparatus 5, then disconnect the portable container 7 from the vacuum frying apparatus 2 and shift it to the open air.

It is preferable that two or more portable containers 7 are provided for improving the efficiency of the invention by unloading a second container 7 and loading it with raw material to be ready for frying while a connected portable container 7 is working with the vacuum frying apparatus 21. Thus permitting a prepared container to be immediately substituted for a disconnected container.

It can be seen that the crumbs unavoidably separated from the fries during frying and oil separation are mostly confined in the container 7, and the connection and disconnection operations of the portable containers are simplified accordingly.

Obviously, many modifications and variations of the present invention are possible in light of the above teachings. It is to be understood therefore, that within the scope of the appended claims, the invention may be practiced otherwise than as specially described herein.

What is claimed is:

1. A vacuum frying and oil separating device comprising:
    (a) a vessel-shaped outer case having an inner space defining a frying compartment provided with an opening and a lid for closing off the opening in an airtight manner;
    (b) a pair of support projectors disposed on opposite walls of the frying compartment, each projector including a recess formed in a top surface thereof;
    (c) a portable container unit disposable within the frying compartment and including a case formed of wire net for containing raw materials to be fried, a port hole in the case, a lid for closing the port hole, a pair of shafts extending laterally from opposite sides of the case, a handle having spaced connecting means for rotatably suspending the case by the shafts, a pair of support plates extending transversely at opposite ends of the handle for engagement within the recesses of the projectors, and a first gear secured on one shaft;
    (d) a driving means including a variable speed reversible motor disposed within the inner space and including a drive shaft extending substantially horizontally into the frying compartment, and a second gear on the drive shaft for intermeshing engagement with the first gear;
    (e) means for removing air from the frying compartment;
    (f) means for supplying heated oil to the frying compartment and withdrawing oil therefrom; and
    (g) a water cooler including a cooling coil attached to the drying compartment for cooling the oil contained therein.

2. The vacuum frying and oil separating device of claim 1 wherein the spaced connecting means includes a pair of connecting rods extending downwardly from the handle, a ring member secured at a lower end of each rod, a pair of ball bearing assemblies, and each ring member sleeving a ball bearing assembly on a shaft of the portable container unit.

3. The vacuum frying and oil separating device of claim 1 wherein the lid includes a bottom surface engageable with the support plates for retaining same within their respective recesses.

4. The vacuum frying and oil separating device of claim 1 further including a plurality of partition members disposed within the case for subdividing same into a plurality of smaller compartments.

* * * * *